(12) United States Patent
Dalal et al.

(10) Patent No.: US 7,836,271 B1
(45) Date of Patent: Nov. 16, 2010

(54) USING A SINGLE ALLOCATOR TO COORDINATE VOLUME TRANSFORMATIONS ACROSS VIRTUALIZATION LAYERS

(75) Inventors: Chirag D. Dalal, Maharashtra (IN); Ronald S. Karr, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1476 days.

(21) Appl. No.: 10/790,656

(22) Filed: Mar. 1, 2004

(51) Int. Cl.
*G06F 12/00* (2006.01)

(52) U.S. Cl. .................. 711/170; 711/165; 711/166; 711/171; 711/172; 711/173; 709/213; 709/223; 709/226

(58) Field of Classification Search ......... 711/165–166, 711/170, 171, 172–173; 709/213, 223–226; 707/1–2, 100, 203–205, 103 R, 103 Y, 103 Z
See application file for complete search history.

(56) References Cited

U.S. PATENT DOCUMENTS

| | | | | |
|---|---|---|---|---|
| 5,946,696 | A * | 8/1999 | Young | 707/104.1 |
| 6,065,011 | A * | 5/2000 | Bulusu et al. | 707/102 |
| 6,192,371 | B1 * | 2/2001 | Schultz | 707/103 R |
| 6,453,324 | B1 * | 9/2002 | Baisley et al. | 707/203 |
| 6,457,139 | B1 * | 9/2002 | D'Errico et al. | 714/5 |
| 6,826,600 | B1 * | 11/2004 | Russell | 709/213 |
| 2003/0229698 | A1 * | 12/2003 | Furuhashi et al. | 709/226 |
| 2006/0069864 | A1 * | 3/2006 | Dalal et al. | 711/114 |

OTHER PUBLICATIONS

Dalal, Chirag Deepak et al., "Development of a Detailed Logical Volume Configuration from High-Level User Requirements," U.S. Appl. No. 10/327,380, filed Dec. 20, 2002.
Dalal, Chirag Deepak et al., "Preservation of Intent of a Volume Creator with a Logical Volume," U.S. Appl. No. 10/324,858, filed Dec. 20, 2002.
Dalal, Chirag Deepak et al., "Adaptive Implementation of Requested Capabilities for a Logical Volume," U.S. Appl. No. 10/325,418, filed Dec. 20, 2002.
Dalal, Chirag Deepak et al., "Language for Expressing Storage Allocation Requirements," U.S. Appl. No. 10/327,558, filed Dec. 20, 2002.
Dalal, Chirag Deepak et al., "Intermediate Descriptions of Intent for Storage Allocation," U.S. Appl. No. 10/327,535, filed Dec. 20, 2002.
Dalal, Chirag Deepak et al., "Identification for Reservation of Replacement Storage Devices for a Logical Volume to Satisfy Its Intent," U.S. Appl. No. 10/724,245, filed Nov. 28, 2003.

(Continued)

*Primary Examiner*—Tuan V Thai
*Assistant Examiner*—Zhuo H Li
(74) *Attorney, Agent, or Firm*—Campbell Stephenson LLP

(57) ABSTRACT

A computer system or memory medium with instructions executable by a computer system to use a single allocator to coordinate volume transformations across virtualization layers. In one embodiment, the computer system creates a first storage object, wherein the first storage object is created to have a property. The computer system creates a second storage object out of the first storage object, wherein the second storage object depends on the property of the first storage object. The computer system then modifies the first storage object, wherein the modified first storage object maintains the property upon which the second storage object depends.

4 Claims, 3 Drawing Sheets

OTHER PUBLICATIONS

Dalal, Chirag Deepak et al., "Technique for Recovering Mirror Consistency in Cooperative Virtual Storage," U.S. Appl. No. 10/788,589, filed Feb. 27, 2004.

Dalal, Chirag Deepak et al., "Identification of Storage to Acquire to Maintain the Intent of Logical Volumes," U.S. Appl. No. 10/812,322, filed Mar. 29, 2004.

* cited by examiner

USING A SINGLE ALLOCATOR TO COORDINATE VOLUME TRANSFORMATIONS ACROSS VIRTUALIZATION LAYERS

BACKGROUND OF THE INVENTION

Businesses employ large scale data processing systems for storing and processing their business critical data. FIG. 1 shows in block diagram form relevant components of an exemplary data processing system 10. FIG. 1 and this background of the invention should not be considered prior art to the claims set forth below.

Data processing system 10 includes a host (e.g., server computer system) 12 coupled to data storage subsystems 16-20 via storage interconnect 22. Storage interconnect 22 may consist of several devices (e.g., routers, switches, etc.) for transmitting input/output (IO) transactions or other data between host 12 and data storage subsystems 16-20. For purposes of explanation, FIG. 1 shows one device 14 within storage interconnect 22 it being understood that the term storage interconnect should not be limited thereto.

Each of the data storage subsystems 16-20 includes several physical storage devices. For purposes of explanation, the physical storage devices of 16-20 take form in hard disks, it being understood that the term physical storage device should not be limited to hard disks. Data storage subsystems 16-20 may take different forms. For example, data storage system 16 may consist of "just a bunch of disks" (JBOD) connected to an array controller card. Data storage subsystem 18 may consist of an intelligent disk array. Data storage system 20 may consist of a block server appliance. For purposes of explanation, each of the data storage subsystems 16-20 will take form in a disk array.

As noted, each of the disk arrays 16-20 includes several hard disks. The hard disk is the most popular, permanent storage device currently used. A hard disk's total storage capacity is divided into many small chunks called physical memory blocks. For example, a 10 GB hard disk contains 20 million physical memory blocks, with each block able to hold 512 bytes of data. Any random physical memory block can be written to or read from in about the same amount of time, without having to first read from or write to other physical memory blocks. Once written, a physical memory block continues to hold data even after the hard disk is powered down.

Host node 12 includes an application 26 which is configured to generate IO transactions for accessing data in a logical data volume (more fully described below) in response to requests received from client computer systems (not shown) coupled to host 12. Host 12 also includes a storage manager 30 coupled to storage object description memory 40 and storage object specifications memory 50. FIG. 1 also shows that each of the devices 14-20 have their own storage managers each coupled to storage object description and storage object specification memories. Each of the storage managers may take form in software instructions executing on one or more processors. Volume Manager™ provided by VERITAS Software Corporation of Mountain View, Calif., is the exemplary storage manager, it being understood that the term storage manager should not be limited thereto.

Storage managers virtualize data storage. Storage virtualization is the technique of aggregating hard disks into one or more virtual disks that typically have better characteristics (e.g., higher storage capacity, greater effective data transfer rates, etc.) than individual hard disks. Hereinafter, virtual disks will be referred to as storage objects. Importantly, storage managers can also create storage objects by aggregating underlying storage objects.

Storage objects are abstractions and can be logically viewed as an array of logical memory blocks that store or are configured to store data. While it is said that a logical memory block stores or is configured to store data, in reality the data is stored in at least one physical memory block of a hard disk allocated directly or indirectly to the storage object. As will be described below, configuration maps or algorithms may be used to map logical memory blocks to physical memory blocks.

As noted, storage objects can themselves be aggregated to form higher level storage objects. Some storage objects (e.g., data volumes) are presented for direct or indirect access by an application such as application 26 executing on host 12. Application 26 can generate IO transactions to read data from or write data to logical memory blocks of a data volume not knowing that the data volume is an aggregation of underlying storage objects, which in turn may be aggregations of hard disks within disk arrays 16-20.

Storage objects are created by storage managers according to the requirements of specifications (also known as intents) provided thereto. Storage object specifications typically define how underlying storage objects or hard disks are to be aggregated. The more common forms of aggregation include concatenated storage, striped storage, mirrored storage, or RAID storage. Specifications may also define the type of underlying storage objects or hard disks to be aggregated. For example, a specification may define that three separate mirrored storage objects (as opposed to RAID storage objects) are to be aggregated to create a stripped storage object having three columns. As a further example, a specification may define that hard disks in separate disk arrays are to be aggregated to form mirrors of a mirrored storage object. A more complete discussion of how storage objects or hard disks can be aggregated can be found within Dilip M. Ranade [2002], "Shared Data Clusters," Wiley Publishing, Inc., which is incorporated herein by reference in its entirety.

A storage object description is created for each storage object. In general, the storage object description relates the storage object to underlying storage objects or hard disks. The description may include a configuration map or algorithm that can be used to map (1) each logical memory block of the storage object to one or more logical blocks of one or more underlying storage objects, or (2) each logical memory block to one or more physical memory blocks. Storage managers 30-38 use configuration maps or algorithms to translate IO transactions that access one storage object into one or more IO transactions that access one or more underlying storage objects or hard disks. Consider for example, a two-way mirrored storage object O created by storage manager 32 from underlying hard disks d1 and d2 (not shown) of disk array 16. Storage object O consists of $n_{max}$ logical memory blocks. Storage manager 32 creates a configuration map for storage object O and stores the configuration map into memory 42. The configuration map maps each logical block n of storage object O to physical blocks x and y in hard disks d1 and d2, respectively. When storage manager 32 receives an IO transaction to write data D to logical memory block 3 of storage object O, storage manager 32 accesses the configuration map for storage object O to learn that logical memory block 3 is mapped to, for example, physical memory blocks 565 and 7668 in hard disks d1 and d2, respectively. Storage manager 32 can then generate first and second IO transactions to write data D to blocks 565 and 7668 in hard disks d1 and d2, respectively.

Storage object descriptions typically include information that defines the properties of storage objects. For example, a storage object description may indicate that a corresponding stripped storage object has three columns each of which consists of an underlying mirrored storage object, or a storage object description may indicate that a corresponding mirrored storage object has two mirrors each of which is formed out of a separate hard disk. It is noted that storage object descriptions may include further information. For instance storage object descriptions may include information indicating that one storage object is a point-in-time copy of another storage object.

Storage managers 30-38 create storage objects according to specification requirements stored within specification memories 50-58, respectively. In conjunction with creating storage objects, storage managers 30-38 create and store storage object descriptions into storage object description memories 50-58, respectively. Moreover, descriptions of storage object properties are exported for consideration to other storage managers that seek to create new storage objects from existing underlying storage objects. It is noted that specifications can change for storage objects over time to reflect, for example, a change in storage strategy or goals. For example, a specification may be changed to accommodate a system administrator's desire to grow, evacuate, relocate, etc., a corresponding storage object. When specifications change, storage managers often change corresponding storage objects and produce new or modified storage object descriptions.

Storage managers don't communicate with each other when a storage object is modified, and this can lead to problems. To illustrate, presume that storage managers 32-36 create storage objects $M1_{Example}$-$M5_{Example}$. Storage objects $M1_{Example}$ and $M4_{Example}$ are created by storage manager 32 according to corresponding specifications in specifications memory 52. Storage objects $M2_{Example}$ and $M5_{Example}$ are created by storage manager 34 according to corresponding specifications in specifications memory 54. Storage object $M3_{Example}$ is created by storage manager 36 according to a corresponding specification in specification memory 56. Each of $M1_{Example}$-$M5_{Example}$ is required by its corresponding specification to be formed by aggregating one or more hard disks contained within a single disk array. Presume that storage objects $M1_{Example}$-$M3_{Example}$ are created from hard disks d1-d3, respectively, of disk arrays 16-20, respectively, and that storage object $M4_{Example}$ and $M5_{Example}$ are created formed from hard disks d4 and d5, respectively, of disk arrays 16 and 18, respectively. Storage object descriptions including configuration maps and storage object properties are created by storage managers 32-36 for storage objects $M1_{Example}$-$M5_{Example}$ and are stored within storage object description memories 42-46. Further, the properties of storage objects $M1_{Example}$-$M5_{Example}$ are provided to storage manager 38 in interconnect device 22 for consideration.

Presume now that storage manager 38 creates mirrored storage objects $S1_{Example}$ and $S2_{Example}$ according to specifications in specifications memory 58. Each of mirrored storage objects $S1_{Example}$ and $S2_{Example}$ is required to have two mirrors. Each mirror of $S1_{Example}$ is required to be formed out of one or more hard disks contained within a single disk array, and each mirror of $S2_{Example}$ is required to be formed out of one or more hard disks contained within a single disk array. Storage manager 38 creates mirrored storage object $S1_{Example}$ out of storage objects $M1_{Example}$ and $M2_{Example}$ since and the descriptive properties of these storage objects meets the specification requirements of $S1_{Example}$, and storage manager 38 creates mirrored storage object $S2_{Example}$ out of storage objects $M3_{Example}$ and $M4_{Example}$ since and the descriptive properties of these storage objects meets the specification requirements of $S2_{Example}$. Storage object descriptions including configuration maps and storage object properties are created by storage manager 38 for storage objects $S1_{Example}$ and $S2_{Example}$ and are stored within storage object description memory 48. Further, the properties of storage objects $S1_{Example}$ and $S2_{Example}$ are provided to storage manager 30 for consideration.

Lastly, presume a system administrator seeks to create a striped data volume $V_{Example}$ for access by application 26. A specification that defines striped data volume $V_{Example}$ is provided to memory 50 within host 12. This specification indicates that striped volume $V_{Example}$ should have two columns, each column consisting of a two-way mirrored storage object. Importantly, the specification for $V_{Example}$ requires the mirrors of each of the two-way mirrored storage objects to be formed from hard disks of separate disk arrays. Storage manager 30 in response to receiving the specification for $V_{Example}$, reviews the properties of storage objects available to it including those of mirrored storage objects $S1_{Example}$ and $S2_{Example}$ provided by storage manager 38. Storage manager 30 learns that the properties of storage objects $S1_{Example}$ and $S2_{Example}$ fit the specification requirements for $V_{Example}$. Accordingly, storage manager 30 aggregates mirrored storage objects $S1_{Example}$ and $S2_{Example}$ as the two columns for striped volume $V_{Example}$. Storage manager 30 also creates and stores in memory 40 the corresponding description including the configuration map for $V_{Example}$.

Now, presume a hardware or software failure renders hard disk d1 unusable, thus rendering storage object $M1_{Example}$ unusable. Storage manager 38 reacts to the unavailability storage object $M1_{Example}$ and reconfigures mirrored storage object $S1_{Example}$ by replacing $M1_{Example}$ with storage object $M5_{Example}$ provided by disk array 18. It is noted that replacing $M1_{Example}$ with storage object $M5_{Example}$ does not violate the specification requirements for $S1_{Example}$ that each of its mirrors be formed from one or more hard disks contained in a single disk array. Storage manager 30 of host 12, however, may be unaware that mirrored storage object $S1_{Example}$ has been reconfigured. The reconfiguration of mirrored storage object $S1_{Example}$ unfortunately violates the specification requirements for striped volume $V_{Example}$ since the specification for $V_{Example}$ requires each column of $V_{Example}$ to be formed out of a two-way mirrored storage object having mirrors formed out of hard disks in separate disk arrays.

SUMMARY OF THE INVENTION

A computer system or memory medium with instructions executable by a computer system to use a single allocator to coordinate volume transformations across virtualization layers. In one embodiment, the computer system creates a first storage object, wherein the first storage object is created to have a property. The computer system creates a second storage object out of the first storage object, wherein the second storage object depends on the property of the first storage object. The computer system then modifies the first storage object, wherein the modified first storage object maintains the property upon which the second storage object depends.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
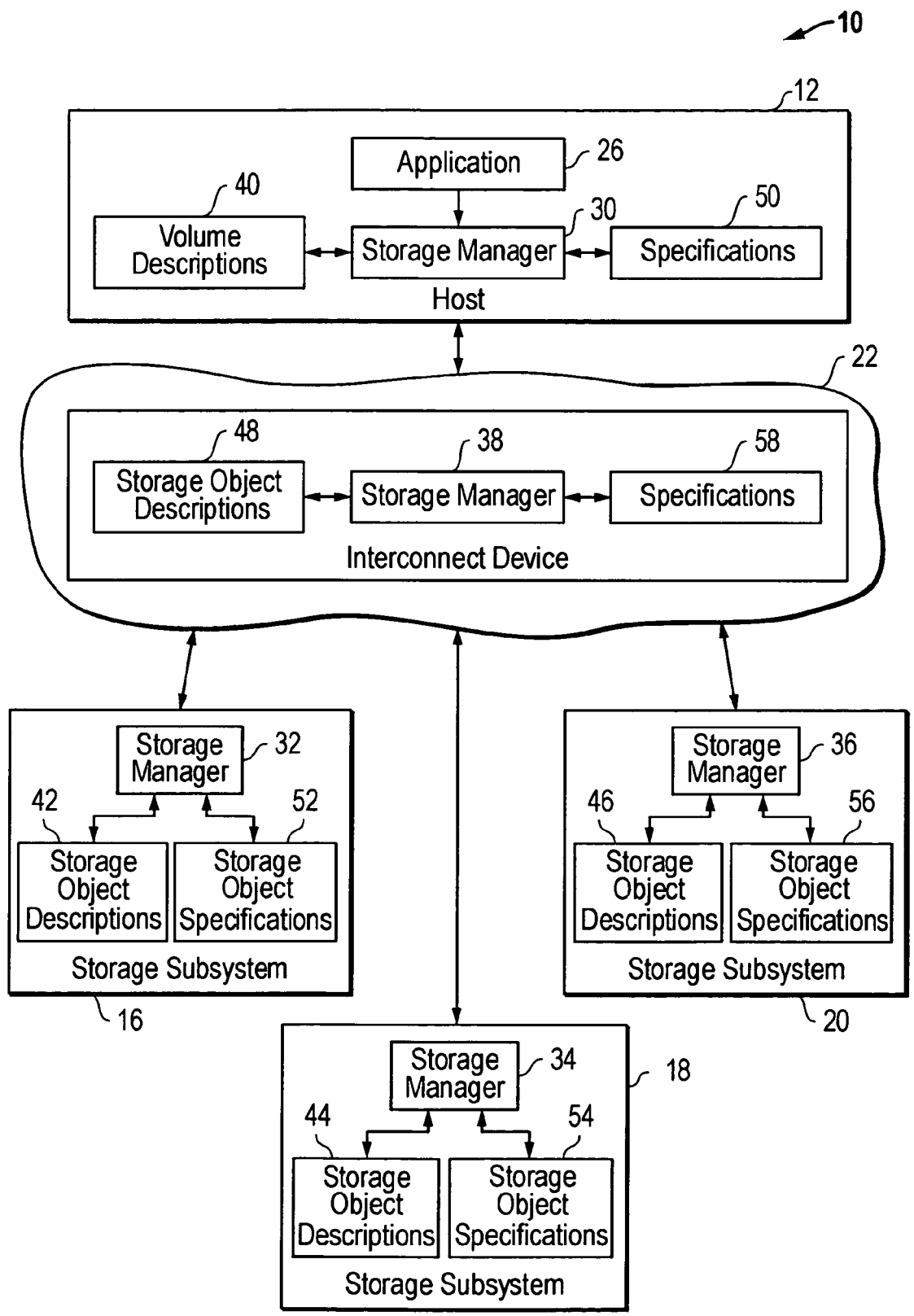
FIG. 1 illustrates a data system in block diagram form in which a logical data volume may be created and used.
Figure 2:
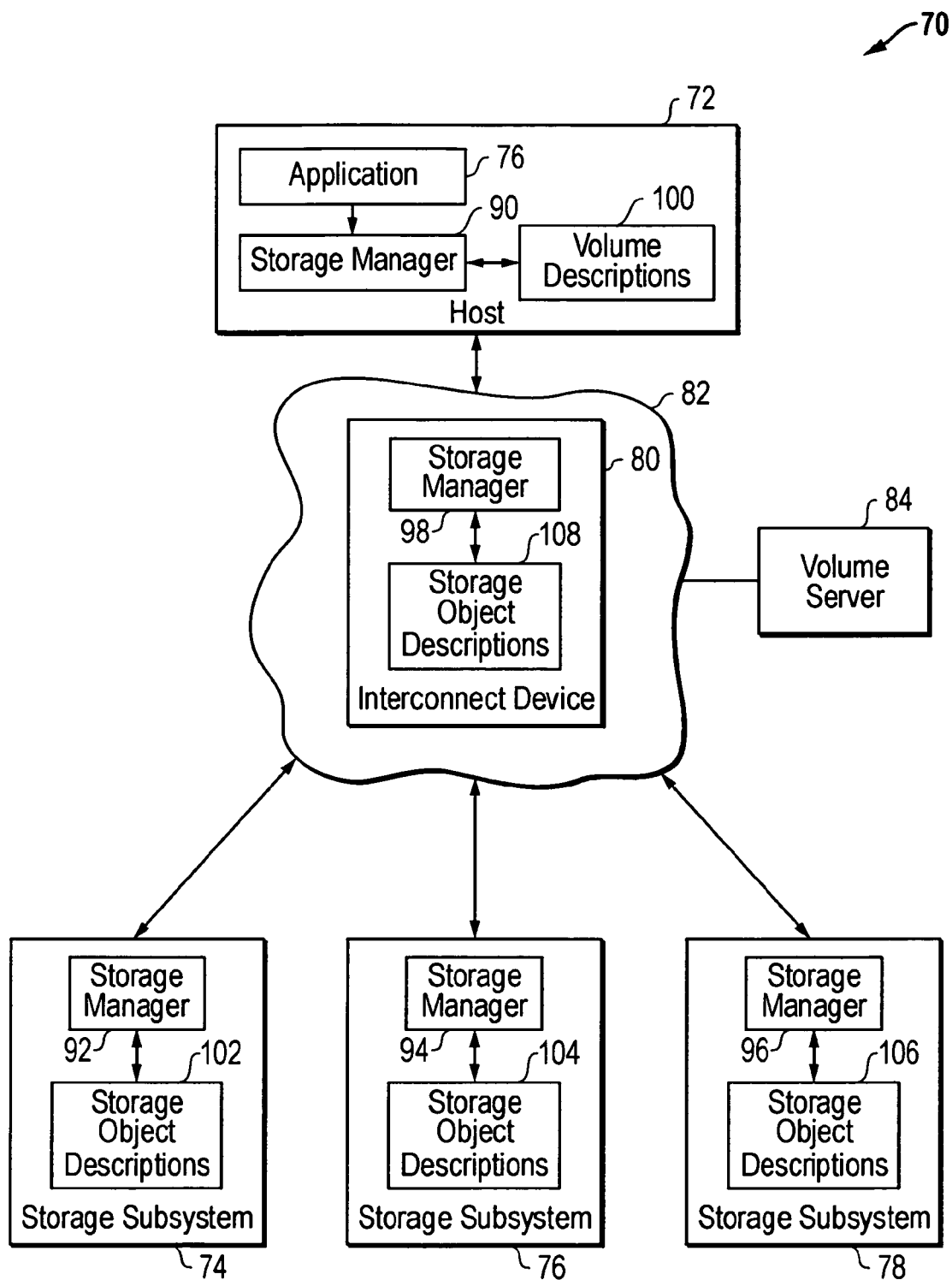
FIG. 2 illustrates a data system in block diagram form in which the present invention may be employed and used.

FIG. 2 illustrates in block diagram form relevant components of an exemplary data processing system 70 employing one embodiment of the present invention. It is noted that the present invention should not be limited to a data processing system such as that shown within FIG. 2. Data processing system 70 includes a host (e.g., server) 72 coupled to data storage subsystems 74-78 via storage interconnect 82. Storage interconnect 82 may consist of several devices (e.g., switches, routers, etc.) coupled together to enable data communication between host 72 and storage subsystems 74-78. For purposes of explanation storage interconnect 82 will be described as having a interconnect device (e.g., Fibre Channel switch) 80 through which host 72 may communicate with storage subsystems 74-78.

Data system 70 also includes a volume server 84 in data communication with host 72, storage subsystems 74-78, and interconnect device 80. Although FIG. 2 shows volume server 84 coupled to host 72, storage subsystems 74-78, and interconnect device 80 via storage interconnect 82, it should be understood that volume server 84 may communicate with host 72, storage subsystems 74-78, and interconnect device 80 via a private network (not shown). However, for purposes of explanation, it will be presumed that volume server 84 communicates with host 72, storage subsystems 74-78, and interconnect device 80 via interconnect 82.

Each of host 72, storage subsystems 74-78, and interconnect device 80 includes one or more processors capable of processing data according to instructions of a software component. As such, each of host 72, storage subsystems 74-78, and interconnect device 80 can be considered a computer system.

Data storage subsystems 74-78 may take differing forms. For purposes of explanation only, each of the data storage subsystems 74-78 is implemented as a disk array having several storage devices, it being understood that the term data storage subsystem should not be limited thereto. The physical storage devices of each of the disk arrays 74-78 is presumed to be implemented as hard disks, it being understood that the term hard disk should not be limited thereto. It is noted that the hard disks disk arrays 74-78 could be virtualized to form logical units (LUNs) for use by a storage manager. However, for purposes of explanation, it will be presumed that the hard disks of disk arrays 74-78 are not virtualized to form LUNs unless otherwise noted.

Host 72 includes an application 76 executing on one or more processors. Application 76 may take one of many different forms. For example, application 76 may take form in a database management system (DBMS), customer relationship management software, etc. Application 76 generates IO transactions for reading data from or writing data to a data volume created by volume server 84.

Volume server 84 creates data volumes having multiple levels of storage objects. To illustrate, the present invention will be described with reference to the creation and subsequent modification of volume V having three storage object levels: a host level, an interconnect level, and a storage level, it being understood that the present invention should not be limited thereto. Volume V, itself a storage object, occupies the host level. Volume V is formed by aggregating a pair of underlying storage objects S1 and S2 that occupy the interconnect level. Storage object S1 is formed by aggregating a pair of underlying storage objects M1 and M2, and storage object S2 is formed by aggregating a pair of underlying storage objects M3 and M4. Storage objects M1-M4 occupy the storage level. Each storage object M1-M4 is formed by aggregating underlying hard disks. Storage objects V, S1, S2, and M1-M4 will be more fully described below.

Each storage object (e.g., data volume) created by volume server 84 is an abstraction and can be viewed as an array of logical memory blocks configured to store data. Again, while is said that logical memory blocks store data, it is to be understood that the data is actually stored in physical memory blocks of hard disks mapped directly or indirectly to the logical memory blocks of the storage object. Data volume storage objects are provided for access to application 76. Thus, application 76 generates IO transactions for reading data from or writing data to logical memory blocks of data volumes provided thereto.

As noted, volume server 84 creates data volumes having multiple storage object levels. Volume server 84 creates the storage objects of the multiple levels that form the data volumes. Volume server 84 creates these multi-level data volumes according to the requirements of specifications ("intents" or aggregation rules) provided thereto. Volume server 84 is also capable of creating and distributing descriptions of the data volume and its underlying levels of storage objects, to various devices (e.g., host 72, disk arrays 74-78, and interconnect device 80) within system 70 for storage therein. Volume server can transform existing multi-level data volumes or its underlying storage objects to accommodate changes in corresponding specifications, to accommodate changes in physical devices (e.g., hard disks) in system 70, or to accommodate growth in storage object size. Lastly, volume server 84 can revise existing descriptions of the data volume and the multiple storage objects within the levels of the data volume, and subsequently distribute the revise descriptions to various devices (e.g., host 72, disk arrays 74-78, and interconnect device 80) within system 70 for storage therein.

Figure 3:
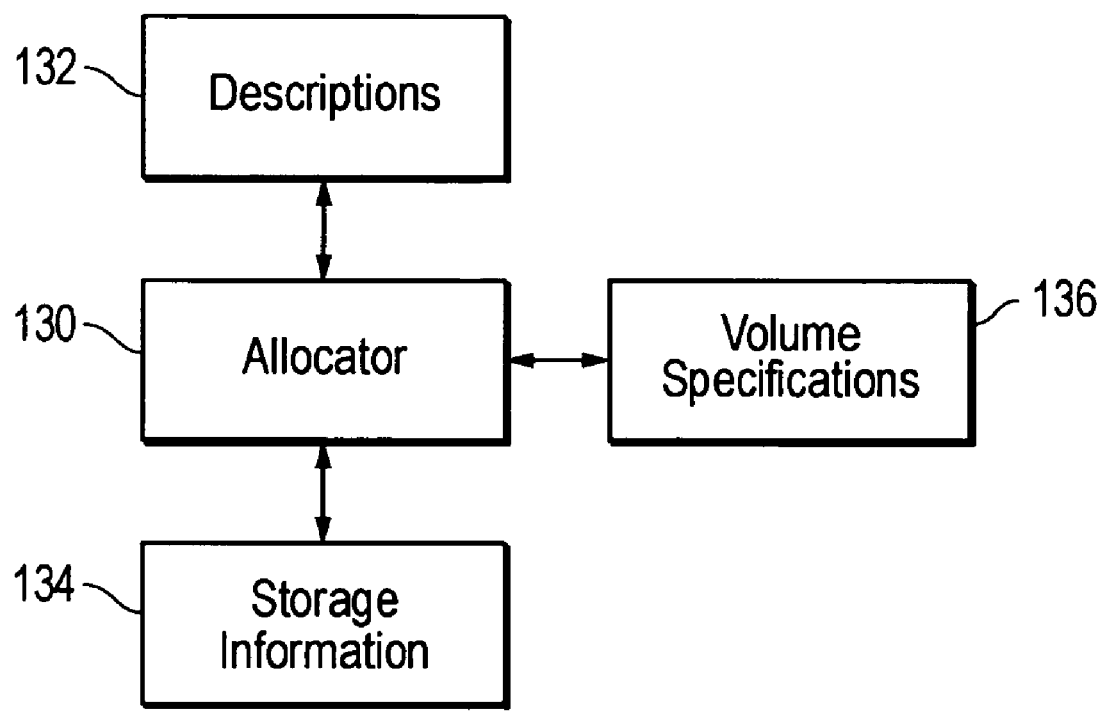
FIG. 3, illustrates relevant components of one embodiment of the volume server shown in FIG. 2.

FIG. 3 illustrates in block diagram form relevant components of an exemplary volume server 84. More particularly, FIG. 3 shows volume server 84 having an allocator 130 in data communication with descriptions memory 132, storage information memory 134, and specifications memory 136. Allocator 130 may take form in software executing on one or more processors of volume server 84. Allocator 130 creates multi-level data volumes, such as exemplary volume V mentioned above, according to multi-level data volume specifications provided to and stored in memory 136. It is noted that the multi-level volume specifications can be generated and provided to memory 136 in accordance with principals described in U.S. patent application Ser. No. 10/327,558, filed Dec. 20, 2002, entitled "A Language for Expressing Storage Allocation Requirements," which is incorporated herein by reference in its entirety. Allocator 130 uses information stored in memory 134 when creating or modifying multi-level data volumes in compliance with specifications in memory 136. Memory 134 stores properties of hard disks within storage subsystems 74-78 in addition to relevant information regarding devices (e.g., host 72, storage subsystems 74-78, and interconnect device 80) in system 70 where descriptions of volumes and their underlying storage objects can be stored and used.

Each volume specification provided to memory 136 sets forth the requirements or aggregation rules that define how the multi-level data volume is to be created and maintained. A volume specification typically describes the manner in which a multi-level data volume and its underlying storage objects are to be formed (e.g., striped storage, mirrored storage, RAID storage, etc.) and the types of underlying storage objects or hard disks that may be used in creating the data volume or its underlying storage objects. To illustrate, presume memory 136 receives a specification for exemplary volume V. This specification requires volume V to be a two-way striped storage object consisting of stripes S1 and S2. Each of the two stripes S1 and S2 are required to be a mirrored storage object having two mirrors. Each minor M1 and M2 of stripe S1 is required to be formed by aggregating one or more hard disks contained within a single disk array, and each mirror M3 and M4 of stripe S2 is required to be formed by aggregating one or more hard disks contained within a single disk array. Lastly, the one or more hard disks aggregated to form mirror M1 is required to be in a disk array separate from the one or more hard disks aggregated to form mirror M2, and the one or more hard disks aggregated to form mirror M3 is required to be in a disk array separate from the one or more hard disks aggregated to form mirror M4.

Allocator 130 can create or modify descriptions for each storage object of multi-level volumes. Each storage object description generally describes the relationship between the corresponding storage object and its underlying storage objects or hard disks. The storage object description may also include a configuration map or configuration algorithm. For purposes of explanation, it will be presumed that storage object descriptions created by allocator 130 include configuration maps, not configuration algorithms. Each configuration map (1) maps a logical memory block of the corresponding storage object to one or more logical memory blocks of one or more underlying storage objects or (2) maps a logical memory block of the corresponding storage object to one or more physical memory blocks of one or more hard disks within disk arrays 74-78. It is noted that storage object descriptions may include additional information.

Storage object descriptions, including their configuration maps, for a data volume and storage objects in its underlying levels, when first created, are stored within memory 132. Additionally, the descriptions for a data volume and its underlying storage objects are distributed by allocator 130 to one or more of the host 72, storage subsystems 74-78, and interconnect device 80 within data system 70 of FIG. 2. For purposes of explanation only, it will be presumed that allocator 130 distributes only the configuration map portions of storage object descriptions to one or more of the host 72, storage subsystems 74-78, and interconnect device 80 within data system 70, it being understood that the present invention should not be limited thereto. These distributed configuration maps are stored within memories 100-108 and used by storage managers 90-98, respectively. The storage managers 90-98 use configuration maps within memories 100-108, respectively, to map a logical memory block of a corresponding storage object to one or more logical memory blocks of one or more underlying storage objects or to one or more physical memory blocks of one or more hard disks contained within disk arrays 74-78. Storage managers 90-98 need configuration maps stored in memories 100-106, respectively, to translate IO transactions directed to a data volume or one of its underlying storage objects into one or more transactions directed to one or more underlying storage objects or hard disks.

As noted above, a specification for exemplary volume V is provided to allocator 130 via memory 136. This specification provides the requirements for volume V and each underlying storage object S1, S2, and M1-M4 thereof. In response to receiving the specification, allocator 130 accesses memory 134 to identify available hard disks within disk arrays 74-78 which have properties (e.g., quantity of unused physical memory blocks) that satisfy the specification requirements for mirrors M1-M4. Presume that allocator 130 learns that hard disks d1-d3 of disk arrays 74-78, respectively, and disk array d4 in disk array 74 have sufficient storage capacity and are available for allocation to M1-M4. Allocator 130 allocates disks d1-d4 to mirrors M1-M4, respectively, and creates the storage object descriptions for mirrors M1-M4. Each description includes a configuration map that maps logical blocks of mirrors M1-M4 to physical memory blocks of hard disks allocated thereto. More particularly, configuration maps CMM1-CMM4 map logical block n of mirrors C1-C4, respectively, to physical memory block x of hard disks d1-d4, respectively, allocated thereto. Thereafter, allocator 130 allocates newly created mirrors M1 and M2 to stripe S1, allocates newly created mirrors M2 and M3 to stripe S2, and creates descriptions for stripes S1 and S2. The description for each stripe S1 and S2 includes a configuration map. More particularly, the description for stripe S1 includes a configuration map CMS1 that maps logical block n of stripe S1 to logical memory blocks n of mirrors M1 and M2, and the description for stripe S2 includes a configuration map CMS2 that maps logical block n of stripe S2 to logical memory blocks n of mirrors M3 and M4. Lastly, allocator 130, in accordance with the exemplary specification, allocates newly created stripes S1 and S2 to volume V. In doing so, allocator 130 creates a description for striped volume V which includes a configuration map CMV that maps each logical block n of volume V to a logical block m within stripe S1 or S2.

Host 72 includes storage manager 90 in data communication with descriptions memory 100. Disk arrays 74-78 and interconnect device 80 include storage managers 90-98, respectively, in data communication with storage object descriptions memories 102-108, respectively. Volume description memory 100 stores volume descriptions generated by volume manager 84, while storage object description memories 102-108 store underling storage object descriptions generated by volume manager 84. It is noted that configuration map memories 100-108 may store configuration algorithms or configuration maps. Configuration algorithms can execute on a processor and, like configuration maps, are used in translating IO transactions to access a volume manager or a storage object (e.g., a data volume) into one or more IO transactions for accessing one or more underlying storage objects (e.g., mirrors of a data volume) or one or more hard disks allocated to the storage object. However, for purposes of explanation, it will be presumed that memories 100-108 store only configuration maps. Each of the storage managers 90-98 is configured to receive and translate IO transactions according to a configuration map contained within memories 100-108, respectively.

Once volume V and its underlying storage objects are created, allocator 130 distributes copies of the configuration maps. More particularly, allocator 130 transmits a copy of the configuration map CMV to host 72 for storage within memory 100. Allocator 130 transmits copies of configuration maps CMS1 and CMS2 to storage interconnect device 80 for storage within memory 108 therein. Lastly, allocator 130 transmits copies of configuration maps CMM1-CMM3 to disk arrays 74-78 for storage within memories 102-106, respectively, and a copy of configuration maps CMM4 to disk array 74 for storage within memory 102. With configuration maps for volume V and its underlying storage objects distributed to and stored in devices 72-82, application 76 is capable of generating IO transactions to read or write data to volume V.

As noted above, allocator 130 is capable of transforming a volume or any of its underlying storage objects to accommodate a change in its corresponding volume specification or to accommodate reconfiguration in, for example, one of the disk arrays 74-78. For purposes of explanation, presume that hard disk d1 is rendered unusable as the result of hardware failure, which in turn renders M1 unusable. Accordingly, allocator 130 accesses physical storage information memory 134 to identify an available hard disk that can replace hard disk d1. Presume that physical storage information memory 134 indicates that hard disks d5 and d6 contained within disk arrays 74 and 76 are available for use. Any modification or transformation of a data volume or its underlying storage objects must be made in compliance with its corresponding specification stored in memory 136. Allocator 130 selects and allocates hard disk d5 to mirror M1 in the example since the specification for volume V dictates that mirror M1 must be formed from hard disks contained within a single disk array and that mirrors M1 and M2 must be formed from hard disks in separate disk arrays. Allocator 130 then revises the description for mirror M1 accordingly. More particularly, allocator 130 modifies the configuration map CMM1 to indicate that logical block n within mirror M1 is mapped to hard disk d5. The modified configuration map overwrites the existing configuration map CMM1 within memory 132. Moreover, allocator 130 sends a copy of the modified configuration map to disk array 74. The existing configuration map CMM1 within memory 102 of disk array 74 is overwritten with this new modified configuration map.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   a computer system creating one or more first storage objects, wherein the one or more first storage objects are created to have individual or collective properties;
   the computer system creating a second storage object out of the one or more first storage objects, wherein the second storage object depends on the individual or collective properties of the one or more first storage objects;
   the computer system receiving information that at least one of the individual or collective properties of the one or more first storage objects has changed and that the second storage object can no longer depend on the individual or collective properties of the one or more first storage objects;
   the computer system responding after receiving the information.

2. The method of claim 1 wherein the computer responding comprises generating a message indicating that warning that that the second storage object can no longer depend on the individual or collective properties of the one or more first storage objects.

3. The method of claim 1 wherein the computer responding comprises replacing the storage object with a new storage object.

4. The method of claim 1 wherein the computer responding comprises modifying the storage object.

* * * * *